Feb. 8, 1949. W. H. ELLIOT 2,460,927
SPEED CONTROL FOR ELECTRIC MOTORS
Filed Oct. 26, 1944 2 Sheets-Sheet 1
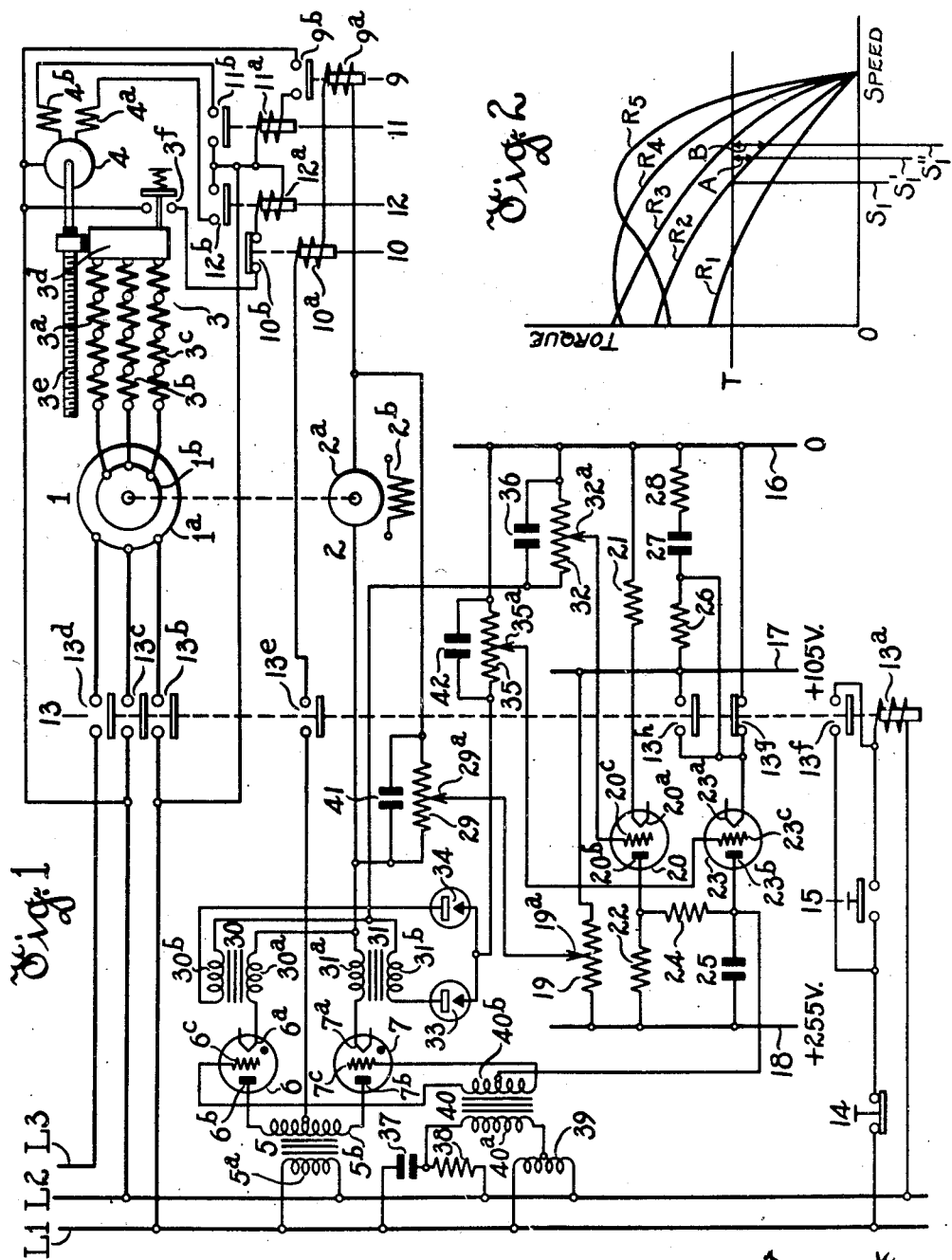
Inventor
William H. Elliot
By Frank Hubbard
Attorney Patented Feb. 8, 1949

2,460,927

UNITED STATES PATENT OFFICE 2,460,927

SPEED CONTROL FOR ELECTRIC MOTORS

William H. Elliot, Shorewood, Wis., assignor to Cutler-Hammer, Inc., Milwaukee, Wis., a corporation of Delaware Application October 26, 1944, Serial No. 560,377

9 Claims. (Cl. 318—45)

This invention relates to a system of automatic speed control over a wide range of speeds of electric motors and while not limited thereto is of particular advantage for the control of motor driven printing presses and the like which must be operated at accurately maintained speeds even though the load varies.

An object of the invention is to provide an automatic speed regulator which responds to tendencies toward variations in speed in their incipiency.

Another object is to provide a speed regulator which limits departure from a given speed upon variations in load to a substantially infinitesimal amount.

Another object is to provide a speed regulating system of the aforesaid character utilizing driving motors of minimum size.

Another object is to provide a two motor driving system in which one motor is provided with regulating means which affords only a limited number of speed points within the range of speeds required, while a second smaller motor supplies supplemental power so as to afford joint operation of the two motors at any desired speed intermediate of any two speed points afforded by the regulator for the large motor.

Another object is to provide a two motor driving system in which the power delivered by one motor is limited to a small fraction of the power delivered by the large motor and in which variations in the load of the small motor are employed to effect control of the large motor.

Other objects and advantages will hereinafter appear.

The accompanying drawings are illustrative of two embodiments of the invention.

In the drawings,

Fig. 1 is a diagram of connections of a system employing a main induction motor and an auxiliary direct current dynamo electric machine.

Fig. 2 is a diagram of the speed-torque characteristics of the machines of Fig. 1, while

Figure 3:
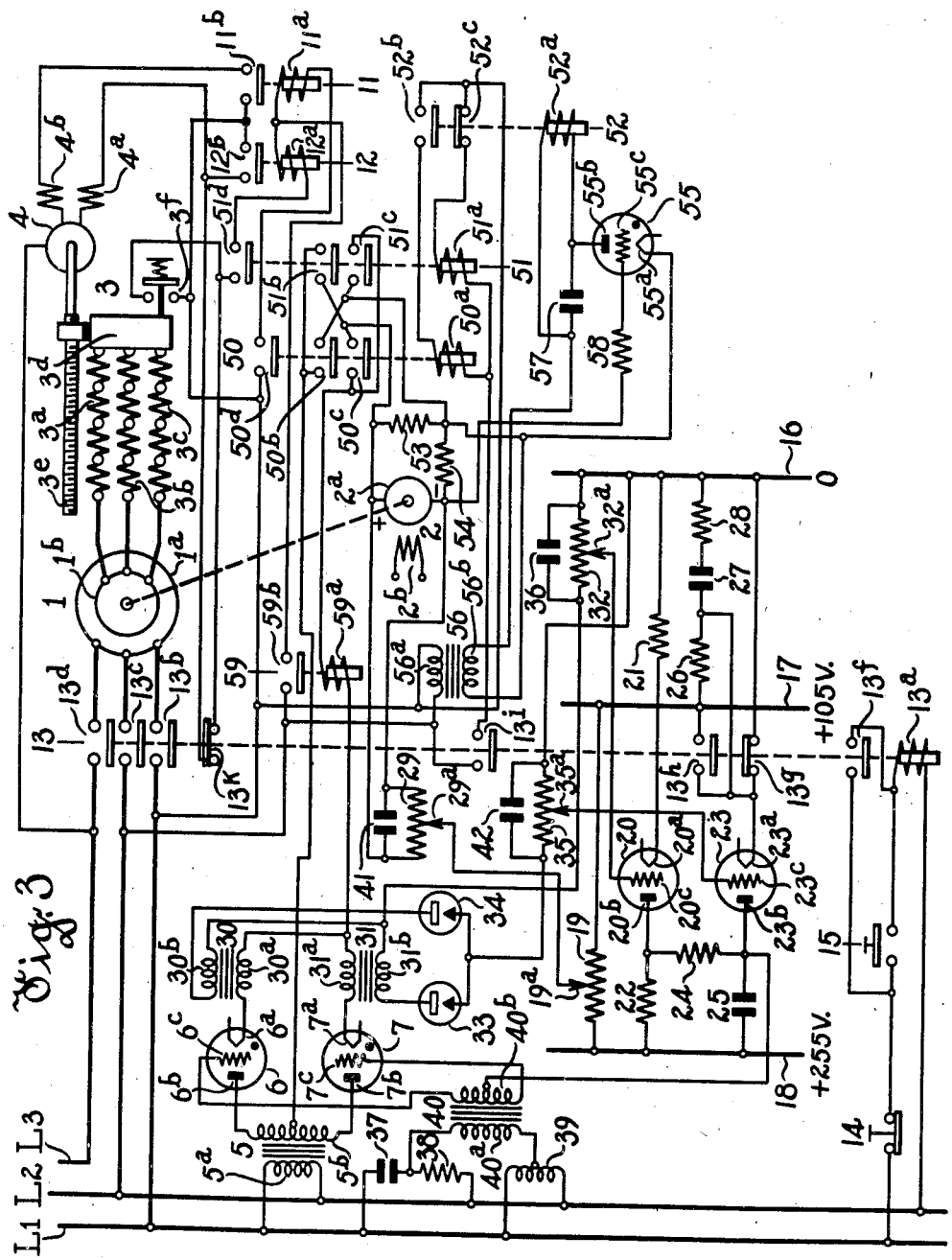
Fig. 3 is a connection diagram of a modification of the system illustrated in Fig. 1.

Referring to Fig. 1, the system is supplied with power from the bus bars L1, L2 and L3 of a three phase power supply. The machine which is to be operated by the system is provided with a slip ring type main motor 1, having a stationary primary winding 1ª, and an armature or secondary winding 1ᵇ, coupled to the driving shaft of the machine. Coupled to this shaft is also the armature 2ª, of an auxiliary direct current motor 2. The motor 2 is provided with a separately excited shunt field winding 2ᵇ, which may be supplied with direct current energy from a suitable source (not shown). The secondary winding 1ᵇ is connected to the star connected resistors 3ª, 3ᵇ and 3ᶜ of a speed regulator 3. The resistors are provided with intermediate taps, each tap being connected to a contact button, the buttons of the different phases being arranged in parallel rows as shown. Said speed regulator is also provided with a cross-head 3ᵈ, and upon reciprocation, said cross-head successively engages the contact buttons of the corresponding resistors to successively cut in or out the different steps of said resistors, to vary the speed of the motor 1. The cross-head 3ᵈ may be reciprocated by an engaging screw 3ᵉ, which is attached to the shaft of a reversible pilot motor 4. The pilot motor 4 is a single phase motor provided with forward and reverse windings 4ª and 4ᵇ, respectively. One terminal of each of the two windings 4ª and 4ᵇ is connected to the line L2, while the connection of the second terminal of the two windings will be explained hereinafter. The regulator 3 is also provided with a limit switch 3ᶠ, having normally closed contacts which are operable to open position when the cross-head 3ᵈ is in the extreme position where all of the resistors 3ª, 3ᵇ and 3ᶜ are inserted in circuit with the winding 1ᵇ.

The armature 2ª is supplied with rectified direct current through a transformer 5, having a primary winding 5ª, connected across the lines L1 and L2, and also a center tapped secondary winding 5ᵇ. The end terminals of winding 5ᵇ are respectively connected to the anodes 6ᵇ and 7ᵇ of gaseous electron tubes 6 and 7, which are also provided with cathodes 6ª and 7ª, respectively, and control electrodes or grids 6ᶜ and 7ᶜ, respectively.

A pilot controller, hereinafter described, is employed to regulate the flow of current through the gaseous electron tubes 6 and 7. It may be of any suitable type to control the instant at which the respective tubes become conducting during their positive half cycles, employing such well known methods as "phase-shift" or "amplitude" control for modifying the grid potentials. The grid potentials of tubes 6 and 7 are so governed in relation to the armature voltage of the auxiliary motor, when compensated for IR drop, that a preset speed may be automatically maintained. The pilot controller preferably also includes means to limit the armature current of motor 2 to a preset maximum value under all conditions of operation.

The system further includes electromagnetic relay 9, having an energizing winding 9ª, and normally open contacts $9^b$, an electromagnetic relay 10, having an energizing winding $10^a$, and normally closed contacts $10^b$, electromagnetic relay 11 having an energizing winding $11^a$ and normally open contacts $11^b$, and electromagnetic relay 12, having an energizing winding $12^a$, and normally open contacts $12^b$. There is also provided an electromagnetic main switch 13, having an energizing winding $13^a$, normally open main contacts $13^b$, $13^c$ and $13^d$ and normally open auxiliary contacts $13^e$, $13^f$ and $13^h$ and normally closed auxiliary contacts $13^g$. A normally closed stop push button switch 14 and a normally open start push button switch 15 provide for manual initiation of starting and stopping of the system.

The pilot controller is constructed as follows: A source of constant voltage direct current supplies the bus bars 16, 17 and 18, the bus bar 16 being at zero potential, while the potentials of the bus bars 17 and 18 are plus 105 volts and plus 255 volts respectively, with respect to the potential of the bus bar 16. Connected across the bus bars 17 and 18, is a voltage dividing resistor 19, having a movable contact $19^a$. A high vacuum electron tube 20, having a cathode $20^a$, and an anode $20^b$, and a control electrode $20^c$, has its cathode $20^a$ connected to the bus bar 16 through a resistor 21, while the anode is connected to the bus bar 18 through a resistor 22. A second high vacuum electron tube 23 provided with a cathode $23^a$, and anode $23^b$, and a control electrode $23^c$, has its cathode connected through the contacts $13^g$ to the bus bar 16, while its anode $23^b$ is connected through a resistor 24 to the anode $20^b$. A smoothing condenser 25 is connected between the bus bar 18 and the anode $23^b$. The cathode $23^a$ is also adapted to be connected to the bus bar 17, through the normally open contacts $13^h$. There is a further connection from the cathode $23^a$, through a condenser 27 and a resistor 28 to the bus bar 16. A resistor 26 is interposed between bus bar 17 and condenser 27. Connected across the terminals of the motor armature $2^a$ is a voltage dividing resistor 29, the contact $29^a$ of which is connected to the movable contact $19^a$. Connected in series with the cathodes $6^a$ and $7^a$, respectively, are the primary windings $30^a$ and $31^a$, of series transformers 30 and 31, respectively. The secondary windings $30^b$ and $31^b$ of said series transformers each have one terminal connected in series with a voltage dividing resistor 32, to the bus bar 16. The other terminals of said secondary windings $30^b$ and $31^b$, are connected through rectifiers 33 and 34, respectively, in series with a voltage dividing resistor 35, to the bus bar 16. A smoothing condenser 36 is connected in parallel with the voltage dividing resistor 32. The grid $20^c$ is connected to the movable contact $32^a$ of the voltage dividing resistor 32, while the grid $23^c$ is connected to the movable contact $35^a$ of voltage dividing resistor 35.

An alternating current component of the control voltage for the tubes 6 and 7 is supplied by a phase shifting network comprising a condenser 37, and a resistor 38, connected in series across the lines L1 and L2. There is also connected across the lines L1 and L2, a center tapped inductance 39. Connected between the center tap of the inductance 39 and the common terminal of the condenser 37 and resistor 38, is the primary winding $40^a$, of a transformer 40, which has a center tapped secondary winding $40^b$. The center tap of the winding $40^b$ is connected to the anode $23^b$, while the outer terminals of said winding are connected to the control electrodes $6^c$ and $7^c$, respectively. Smoothing condensers 41 and 42 are connected across the resistors 29 and 35, respectively.

Upon closure of main switch 13, a circuit extends from the center tap of winding $5^b$ through contacts $13^e$, through the windings $10^a$ and $9^a$, armature $2^a$, through the windings $30^a$ and $31^a$, respectively, to the cathodes $6^a$ and $7^a$, through the tubes 6 and 7, back to the winding $5^b$. Another circuit extends from line L1, through winding $12^a$, contacts $10^b$ and $3^f$ (when closed), to line L2. Another circuit extends from line L1, through winding $11^a$, contacts $9^b$ (when closed), to line L2. There is also a circuit from line L1, through contacts $12^b$ (when closed), winding $4^a$, to line L2, and a circuit from line L1, through contacts $11^b$ (when closed), winding $4^b$, to line L2. A still further circuit extends from line L1, through push button switches 14 and 15, upon closure of the latter, through winding $13^a$, to line L2, while a maintaining circuit is provided by the contacts $13^f$, which when closed short circuits the contacts of switch 15.

Before explaining the operation of the system it is desirable to review some of the fundamental operating characteristics of the motors 1 and 2, for which reference is made to Fig. 2 of the accompanying drawing. It is assumed that the rheostat 3 is provided in each phase with four sections of resistance, thus affording five speed points. The diagram of Fig. 2 shows five curves marked $R_1$ to $R_5$, respectively, which represent the relation between the speed of the motor 1 and the torque it is capable of exerting at the five positions of the cross-head.

It will be observed that if the torque required by the machine is T, and the speed desired is $S_1$, the cross-head $3^d$ must be on the second speed point, that is, the total resistance inserted in the rotor circuit of motor 1 is $R_2$. Under these conditions the motor 2 is not required to supply any additional torque. If, on the other hand, the speed $S_1'$ is required, the motor 1 will not have sufficient torque to produce that torque at that speed. It is therefore necessary for the motor 2 to supply an additional torque marked A in the diagram. Similarly, is a speed $S_1''$ is required, the motor 2 must supply the torque B.

The motor 2 is a separately excited direct current motor, the torque of which, neglecting for the present the armature reaction, is proportional to the armature current. Also the armature voltage of the motor 2, neglecting the resistance drop in the armature, is directly proportional to its speed.

As will be explained more fully hereinafter, the aforedescribed pilot controller is arranged in such a manner that it responds to the electromotive force induced in the armature of the motor 2. This voltage controls through grids $6^c$ and $7^c$, respectively, the current flow through the corresponding tubes to adjust the current of the armature $2^a$, so that the system will run at the desired speed. The maximum current supplied to motor 2, and therefore the maximum torque afforded thereby, is limited by the controller, and provision is made for commutating the resistor 3 in such a manner that the motor 1 supplies the principal component of the total torque, or in other words, that part by which the total torque exceeds the maximum torque deliverable by the motor 2 as will be explained hereinafter.

The system thus far described operates as follows: Assuming that the machine is at rest and the pilot controller or speed setting device has been adjusted to a position corresponding to a desired operating speed, the operator then starts the equipment by pushing the starting button 15 thereby establishing a circuit from line L1, through push button switches 14 and 15, winding 13ª, to line L2. This energizes the main switch 13 which upon energization closes the contacts 13¹ to maintain the coil 13ª energized when the push button switch 15 is released.

Energization of winding 13ª also closes the main contacts 13ᵇ, 13ᶜ and 13ᵈ, thereby connecting the terminals of the primary winding 1ª, to the lines L1, L2 and L3. With the cross-head 3ᵈ in the position shown and the motor 1 thus energized, maximum resistance is inserted in the circuit of the winding 1ᵇ and the motor 1 tends to operate at its lowest speed. Energization of the winding 13ª also closes the contacts 13ᵉ, thereby completing a circuit for the armature 2ª, and inasmuch as the armature 2ª just starts to rotate, the current which it receives is the maximum to which it is limited by its control circuit, for example, 125% of rated current. The motor 2 therefore exerts its maximum torque, which is added to the torque of motor 1 to accelerate the machine. The current of armature 2ª passes through the windings of relays 9 and 10. The relay 9 is arranged so that it will respond to close contacts 9ᵇ when the current of armature 2ª is approximately 100% of the normal current and it will respond to open the contacts 9ᵇ when the current falls to some lower value. On the other hand, the relay 10 is arranged to open the contacts 10ᵇ when its energizing current is equal to 10 to 15% of the normal current of the armature 2ª, and will close the contacts 10ᵇ when the magnitude of the current is slightly below this value.

The current supplied to the motor armature 2ª through the tubes 6 and 7 is controlled by controlling the potential impressed on the control electrodes 6ᶜ and 7ᶜ with respect to their respective cathodes. The potential of the grids 6ᶜ and 7ᶜ with respect to their cathodes is the resultant of an alternating voltage supplied by winding 40ᵇ, upon which is superposed the unidirectional potential drop through resistors 29, 19, 22 and 24. The arrangement of the circuit is such that the moment of ignition of the tubes 6 and 7 is advanced to increase the speed of the motor armature 2ª when the contact 19ª is moved toward the bus bar 17. On the other hand, when the current through the resistors 22 and 24 is increased, the resulting voltage drop delays the moment of ignition of the tubes 6 and 7, and thus decreases the average current supplied to the motor 2 and thereby its speed is decreased.

The current through the resistors 22 and 24 is controlled through the tubes 20 and 23. These tubes are caused to respond to the current required by the motor armature to compensate for the speed drop of the motor armature due to its resistance. It will be observed that the voltages induced in the windings 30ᵇ and 31ᵇ are proportional to the current drawn by the armature 2ª. A rectified current, due to said voltages, flows from said windings through the resistors 32 and 35, back through the rectifiers 33 and 34, to the secondary windings 30ᵇ and 31ᵇ. Thus the voltage drop through these resistors is directly proportional to the armature current.

At the moment before starting the equipment, no current flows in the circuit of the armature 2ª. Therefore there is also no voltage drop through the resistor 32, and due to the voltage drop in the resistor 21 the potential of the grid 20ᶜ with respect to the cathode 20ª is slightly negative. The adjustment is such that some current still flows through the tube 20. The potential of the grid 23ᶜ is zero with respect to its cathode 23ª. As a result the tube 23 draws a current which passes through the resistors 22 and 24, to produce a substantial voltage drop therein which impresses a potential on the control electrodes 6ᶜ and 7ᶜ which is negative with respect to the cathodes 6ª and 7ª to an extent that the tubes do not pass any current. However, when the starting button 15 is pressed and the switch 13 responds, the contacts 13ᵍ are opened so that a charging current flows from the bus bar 16, through resistor 26, condenser 27, through contacts 13ʰ, to bus bar 17. The charge of the condenser 27 raises the potential of the cathode 23ª to make the grid 23ᶜ negative with respect to the cathode and the current passed by the tube 23 gradually decreases, thereby decreasing the voltage drop through the resistors 22 and 24, until finally the potential impressed upon the control electrodes 6ᶜ and 7ᶜ is sufficiently positive to cause ignition of said tubes during the positive half cycle with resulting passage of current and acceleration of the motor 2. The variation of said grid voltage takes place in a comparatively short time, the purpose being to prevent a too sudden rush of current to the armature. After the motor has accelerated, the drop through the resistor 22 is not sufficient to stop conduction of the tubes 6 and 7.

As the current taken by the armature 2ª increases, the voltage across the resistor 32 increases, which causes the grid 20ᶜ to become negative with respect to its cathode. This reduces the current through resistor 22 and hence advances the moment of ignition of the tubes 6 and 7 to permit a higher effective output current to compensate for the voltage drop in the armature due to the armature resistance. The system is so proportioned that when the armature 2ª draws normal full load current, the conduction of the tube 20 is stopped so that any further increase in the armature current would have no effect on the regulation effect of said tube. However, the voltage drop across the resistor 35 is increased at the same time and this voltage is applied to the grid 23ᶜ, which is normally negative with respect to the cathode 23ª, as has been explained heretofore. The circuit is so arranged that when the current in the armature circuit reaches the allowable maximum, the tube 23 becomes conducting which causes a voltage drop through the resistors 22 and 24, to thereby retard the moment of ignition of the tubes 6 and 7.

The system provides for an additional compensating voltage component which is proportional to the armature voltage and therefore the speed. The resistor 29 is connected across the armature 2ª, and therefore the potential of the movable contact 29ª for any setting is directly proportional to the armature voltage. For this purpose the contact 29ª is connected to the contact 19ª, of the voltage divider 19. The contact 29ª is normally set to apply a given portion of the armature voltage to the grids 6ᶜ and 7ᶜ and this voltage is balanced out by the drop in the resistor 19 when the motor operates at the speed corresponding to the setting of contact 19ª. If the motor runs with a given load and the load tends to increase, the armature voltage will tend to decrease. This decreases the voltage drop in resistor 29 until a new balance is obtained through the action of the regulator which causes the motor speed to increase again until the voltage drop in the resistors 35 and 19 are alike.

It will be apparent that as long as the speed of the system is much below that for which the resistor 19 is adjusted, the motor 2 operates with its full load current, while motor 1 supplies additional torque.

As a result of the high value of the armature current, the contacts 9$^b$ are closed, but the contacts 10$^b$ are opened. This causes energization of the relay 11, which in turn closes its contacts 11$^b$, thereby supplying power through the winding 4$^b$ of the motor 4 and causing the pilot motor 4 to rotate to move the cross-head 3$^d$ in a direction to cut out part of the resistors 3$^a$, 3$^b$ and 3$^c$.

As the speed approaches the value for which the pilot controller is set, the motor 1 may tend to take all of the load, with the result that the current taken by the armature 2$^a$ is decreased by action of the tubes 6 and 7, and the contacts 9$^b$ are opened, thereby deenergizing relay 11, which in turn disconnects pilot motor 4 to stop further reduction of resistor 3. The motors 1 and 2 now divide the load between each other in accordance with their respective characteristics. If later the load on the system decreases, the motor 1 tends to accelerate above the desired speed. This results in a decrease of the current of the armature 2$^a$, which, if great enough, will make the current sufficiently low to permit closure of the contacts 10$^b$ of the relay 10, whereby the relay coil 12$^a$ is energized, causing closure of the contacts 12$^b$, which in turn energizes the motor winding 4$^a$. This causes the pilot motor 4 to operate in the reverse direction to move the cross-head 3$^d$, to increase the amount of resistance inserted by the resistors 3$^a$, 3$^b$ and 3$^c$ in the circuit of the armature 1$^b$. This action of the resistor 3 causes a decrease of the speed of the machine with a corresponding increase of the current taken by the armature 2$^a$, to a value which will maintain the speed of the machine in accordance with the adjustment of the pilot controller.

Referring now to Fig. 3, the same shows a modification of Fig. 1, in which the circuit connections of the auxiliary motor 2 are reversible to produce a torque either in the same direction as the motor 1, or in opposition thereto, depending upon whether the speed which obtains with a given adjustment of the rheostat 3 is below or above the desired speed for which the pilot controller is set.

In the modification, Fig. 3, the relays 9 and 10 and contacts 13$^e$ of switch 13 of Fig. 1 have been omitted and normally open contacts 13$^i$ and normally closed contacts 13$^k$ have been added to the main switch 13. There is also added a reversing switch, comprising the electromagnetic switches 50 and 51, having energizing windings 50$^a$ and 51$^a$, respectively, normally open main contacts 50$^b$, 50$^c$ and 51$^b$, 51$^c$, respectively, and normally open auxiliary contacts 50$^d$ and 51$^d$, respectively. An electromagnetic relay 52 is added which has an energizing winding 52$^a$, normally open contacts 52$^b$ and normally closed contacts 52$^c$. Connected in series with each other and across the armature 2$^a$ are resistors 53 and 54. A gaseous electron tube 55 is provided, having a cathode 55$^a$, an anode 55$^b$, and a control grid 55$^c$. The winding 52$^a$ is connected between the anode 55$^b$ and one end tap of the secondary winding 56$^b$ of an isolating transformer 56. The transformer 56 has a primary winding 56$^a$, connected to the lines L1 and L2. A condenser 57 is connected in shunt with the winding 52$^a$. The cathode 55$^a$ is connected to the common terminal of the resistors 53 and 54, and to the remaining end tap of winding 56$^b$, while the grid 55$^c$ is connected in series with a limiting resistors 58, to the common point of the armature 2$^a$ and the resistor 54. A relay 59 is provided, having an energizing winding 59$^a$ and normally open contacts 59$^b$.

In addition to the connections of the elements which are the same as those of the system Fig. 1, there are the following further connections: A circuit extends from line L1, through the contacts 52$^c$, energizing winding 51$^a$, contacts 13$^i$, when closed, to line L2. Another circuit extends from line L1, through contacts 52$^b$, when closed, winding 50$^a$, through contacts 13$^i$, when closed, to line L2. The cathode 55$^a$ is connected to one terminal of each of the contacts 50$^b$ and 51$^c$. One terminal of each of the contacts 50$^b$ and 51$^b$ is connected to the center tap of the winding 5$^b$. One terminal of each of contacts 50$^c$ and 51$^b$ is connected to the common terminal of the resistor 53 and the armature 2$^a$, while one terminal of each of the contacts 50$^c$ and 51$^c$ is connected through the winding 59$^a$, transformer windings 30$^a$ and 31$^a$ to the respective cathodes 6$^a$ and 7$^a$. A circuit also extends from line L1, through limit switch 3$^f$, when closed, through contacts 51$^d$, winding 12$^a$, contacts 59$^b$, when closed, to line L2, and another circuit from line L1, through contacts 50$^d$, winding 11$^a$, contacts 59$^b$, when closed, to line L2. A further circuit extends from limit switch 3$^f$, through contacts 13$^k$, when closed, to the terminal of winding 4$^a$, which is also connected to the contact 12$^b$.

The operation of this modified system shown in Fig. 3 is as follows: After the rheostat 19 has been adjusted to the speed at which it is desired to operate, the starting button 15 is depressed, which energizes the coil 13$^a$ as has been explained heretofore, thereby energizing the motor 1. The potential of grid 55$^c$ is zero with respect to cathode 55$^a$, so that tube 55 conducts current, which energizes coil 52$^a$, to close contacts 52$^b$, thereby establishing a circuit from line L1, through contacts 52$^b$, coil 50$^a$, contacts 13$^i$ to line L2. This energizes the forward switch 50. The interrupted unidirectional current flowing to the coil 52$^a$ during alternate half-waves of the alternating current supply is smoothed out by the condenser 57 in the usual manner, to maintain energization of the coil during the half-cycle when the tube 55 is non-conducting. Response of relay 52 also opens the contacts 52$^c$, thereby deenergizing the switch 51. The closing of contacts 50$^b$ and 50$^c$ connects the armature 2$^a$ in series with the tubes 6 and 7 to the transformer winding 5$^b$, and causes the motor 2 to supply a positive torque. The arrangement is such that the current flow in the armature 2$^a$ is of the order of 125% of normal. The relay 59 responds to the armature current, closing the contacts 59$^b$. This completes the circuit for the winding 11$^a$ of the relay 11, thereby energizing the winding 4$^b$ of the pilot motor 4, causing it to rotate to reduce the resistor 3 which accelerates the motor 1. Ultimately the cross-head 3$^d$ will have cut out sufficient resistance so that the speed of the motor 1 is approximately that for which the pilot speed controller is set. When this approximate speed is attained, the current of the motor 2 is reduced to a value which ultimately causes sufficient deenergization of the relay coil 59$^a$ and the relay 59 opens to stop the motor 4 and prevents further reduction of the resistance of resistor 3.

As long as the motor 2 supplies a positive torque, that is, as long as the torque of motor 1 alone is insufficient to afford the desired speed, a current flows through the resistor 54 in such a direction that the voltage drop through the latter causes the potential of the grid 55c to tend to become positive with respect to the cathode 55a. The grid 55c is prevented from becoming positive only by the action of grid resistor 58. Under this condition tube 55 is conducting, relay 52 remains energized, and relay 50 is energized through contacts 52b. If now the speed of the motor 1 should become sufficiently higher than that for which the speed regulator is set, the motor 2 is driven as a generator so that current in this case flows from the terminal of the armature 2a marked +, through the resistors 53 and 54 and back to the terminal marked —. This makes the grid 55c negative with respect to the cathode 55a, so as to cause tube 55 to become non-conducting and relay 52 to become deenergized. This causes energization of relay 51 through contacts 52c and reversal of the connections of the armature 2a with respect to the current supply, so that the torque of the motor 2 and the polarity of the armature are reversed, the motor thereby exerting a braking effect.

In the arrangements illustrated in each of Figs. 1 and 3 the pilot motor 4 remains at rest unless the current of motor armature 2a reaches a sufficiently high value, say 100% of rated value. The result of attaining such a high value, in Fig. 3, for example, is to cause closure of contacts 59b by energization of coil 59a. In this event the pilot motor runs in one direction or the other, depending upon whether contacts 50d or 51d are closed, until the current has dropped sufficiently to drop out relay 59. In all speed and torque conditions between those which cause energization of relay 59, the auxiliary motor 2 provides stepless control of speed and supplies sufficient positive or negative torque at all times to maintain the preset speed in spite of changes in the load torque. The characteristics of the system of Fig. 1 in this respect will be apparent from the foregoing description.

I claim:

1. In a system for obtaining and maintaining a preselected speed of a prime mover subjected to a varying load, in combination, a prime mover, means to supply power to said prime mover, means to regulate such power between given limits in a predetermined number of equal steps, an auxiliary dynamo electric machine coupled to said prime mover to coact with said prime mover and automatic control means for said dynamo electric machine, comprising, a source of energy supply for said dynamo electric machine to afford a flow of energy between said source and said dynamo electric machine in varying amounts according to departures of the speed of said prime mover from the preselected speed, and means responsive to flow of energy between said dynamo electric machine and said energy source but only when in excess of the power change afforded by one of said steps, to effect adjustment of said power regulating means, following gradual return of said motor toward the preselected speed by the coaction of said dynamo electric machine, whereby said power regulating means and said dynamo electric machine jointly provide smooth continuous speed regulation.

2. In a system for obtaining and maintaining a preselected speed of a motor subjected to a varying load, in combination, a motor, means to supply electric power to said motor, means to regulate such power between given limits in a predetermined number of equal steps, an auxiliary dynamo electric machine coupled to said motor to coact with said motor and automatic control means for said dynamo electric machine, comprising, a source of energy supply for said dynamo electric machine to afford a flow of energy between said source and said dynamo electric machine in varying amounts according to departures of the speed of said motor from the preselected speed and means responsive to flow of energy between said dynamo electric machine and said energy source but only when in excess of the power change afforded by one of said steps, to effect adjustment of said power regulating means, following gradual return of said motor toward the preselected speed by the coaction of said dynamo electric machine, whereby said power regulating means and said dynamo electric machine jointly provide smooth continuous speed regulation.

3. In a system for obtaining and maintaining a preselected speed of a motor subjected to a varying load, in combination, a motor, means to supply electric power to said motor, means to regulate such power between given limits in a predetermined number of equal steps, an auxiliary dynamo electric machine coupled to said motor to coact with said motor and automatic control means for said dynamo electric machine, comprising, a source of energy supply for said dynamo electric machine to afford a flow of energy between said source and said dynamo electric machine in varying amounts according to departures of the speed of said motor from the preselected speed and means responsive to flow of energy between said dynamo electric machine and said source but only when in excess of the power change afforded by one of said steps, to effect adjustment of the step by step regulating means following gradual return of said motor toward the preselected speed by the coaction of said dynamo electric machine, whereby said speed regulating means and said dynamo electric machine jointly provide smooth continuous regulation.

4. In a system for obtaining and maintaining a preselected speed of a motor subjected to a varying load, in combination, a motor, means to supply electric power to said motor, means to regulate such power between given limits in a predetermined number of equal steps, an auxiliary dynamo electric machine coupled to said motor to assist said motor and automatic control means for said dynamo electric machine, comprising, a source of energy supply for said dynamo electric machine from which it draws energy in varying amounts according to departures of the speed of said motor from the preselected speed and means responsive to flow of energy between said dynamo electric machine and said source but only when in excess of the power change afforded by one of said steps, to effect adjustment of the step by step regulating means following gradual return of said motor toward the preselected speed by the assisting action of said dynamo electric machine, whereby said means and said dynamo electric machine jointly provide smooth continuous speed regulation.

5. In a system for obtaining and maintaining a preselected speed of a motor subjected to a varying load, in combination, a motor, means to supply electric power to said motor, means to regulate such power between given limits in a predetermined number of equal steps, an auxiliary dynamo electric machine coupled to said motor to selectively assist or buck said motor and automatic control means for said dynamo electric machine, comprising, a source of energy supply for said dynamo electric machine from which it draws or delivers energy in varying amounts according to departures of the speed of said motor from the preselected speed and means responsive to flow of energy between said dynamo electric machine and said source but only when in excess of the power change afforded by one of said steps, to effect adjustment of the step by step regulating means following gradual return of said motor toward the preselected speed by the assisting or bucking action of said dynamo electric machine, whereby said speed regulating means and said dynamo electric machine jointly provide smooth continuous regulation.

6. In a system for obtaining and maintaining a preselected speed of a motor subjected to a varying load, in combination, a motor, means to supply electric power to said motor, means to regulate such power between given limits in a predetermined number of equal steps, an auxiliary dynamo electric machine coupled to said motor to coact with said motor and automatic control means for said dynamo electric machine, comprising, a source of energy supply for said dynamo electric machine to afford a flow of energy between said source and said dynamo electric machine in varying amounts according to departures of the speed of said motor from the preselected speed and means responsive to flow of energy between said dynamo electric machine and said source but only when in excess of the power change afforded by one of said steps, to effect adjustment of the step by step regulating means following gradual return of said motor toward the preselected speed by the coaction of said dynamo electric machine, whereby said speed regulating means and said dynamo electric machine jointly provide smooth continuous regulation, said last mentioned means including means to limit such flow of energy to a given maximum.

7. In a system for obtaining and maintaining a preselected speed of a motor subjected to a varying load, in combination, a motor, means to supply electric power to said motor, means to regulate such power between given limits in a predetermined number of equal steps, an auxiliary dynamo electric machine coupled to said motor to coact with said motor and automatic control means for said dynamo electric machine, comprising, a source of alternating current, electronic means connected between said dynamo electric machine and said source to afford a flow of rectified current therebetween in amounts varying according to departures of the speed of said motor from the preselected speed and means responsive to flow of current between said dynamo electric machine and said source but only when in excess of the power change afforded by one of said steps, to effect adjustment of the step by step regulating means following gradual return of said motor toward the preselected speed by the coaction of said dynamo electric machine, whereby said speed regulating means and said dynamo electric machine jointly provide smooth continuous regulation, said last mentioned means including means to limit said flow of current to a given maximum.

8. In a system for obtaining and maintaining a preselected speed of a motor subjected to a varying load, in combination, an induction motor, means to supply electric power to said motor, means to regulate such power between given limits in a predetermined number of equal steps, an auxiliary dynamo electric machine coupled to said motor to selectively assist or buck said motor and automatic control means for said dynamo electric machine, comprising, a source of alternating current, electronic means connected between said dynamo electric machine and said source to afford a flow of rectified current therebetween in amounts varying according to departures of the speed of said motor from the preselected speed and means responsive to flow of current between said dynamo electric machine and said source but only when in excess of the power change afforded by one of said steps, to effect adjustment of the step by step regulating means following gradual return of said motor toward the preselected speed by the coaction of said dynamo electric machine, whereby said speed regulating means and said dynamo electric machine jointly provide smooth continuous regulation, said last mentioned means including means to limit said flow of current to a given maximum.

9. In a system for obtaining and maintaining a preselected speed of a motor subjected to a varying load, in combination, an induction motor, means to supply electric power to said motor, means to regulate such power between given limits in a predetermined number of equal steps, an auxiliary dynamo electric machine coupled to said motor to assist said motor and automatic control means for said dynamo electric machine, comprising, a source of alternating current, electronic means connected between said dynamo electric machine and said source to afford a flow of rectified current therebetween in amounts varying according to departures of the speed of said motor from the preselected speed and means responsive to flow of current between said dynamo electric machine and said source but only when in excess of the power change afforded by one of said steps, to effect adjustment of the step by step regulating means following gradual return of said motor toward the preselected speed by the assisting action of said dynamo electric machine, whereby said speed regulating means and said dynamo electric machine jointly provide smooth continuous regulation, said last mentioned means including means to limit said flow of current to a given maximum.

WILLIAM H. ELLIOT.

REFERENCES CITED

The following references are of record in the file of this patent:

UNITED STATES PATENTS

| Number | Name | Date |
|---|---|---|
| 1,231,666 | Stuart | July 3, 1917 |
| 1,944,756 | Quarles | Jan. 23, 1934 |
| 2,066,508 | Young | Jan. 5, 1937 |
| 2,236,086 | Conover | Mar. 25, 1941 |
| 2,319,625 | Ostrander | May 18, 1943 |
| 2,352,626 | Grabau | July 4, 1944 |
| 2,356,051 | Hanna et al. | Aug. 15, 1944 |